United States Patent [19]

Nigam et al.

[11] Patent Number: 5,973,025
[45] Date of Patent: Oct. 26, 1999

[54] AQUEOUS INK COMPOSITIONS CONTAINING A BINDER OF A NEUTRALIZED ACIDIC RESIN

[75] Inventors: Asutosh Nigam, Fremont; Subhash Narang; Sei-ichi Yokoi, both of Redwood City; Sivapackia Ganapathiappan, Fremont; Jitender Mohan Khurana, Mountain View, all of Calif.

[73] Assignee: SRI International, Menlo Park, Calif.

[21] Appl. No.: 08/420,847

[22] Filed: Apr. 11, 1995

Related U.S. Application Data

[63] Continuation-in-part of application No. 08/225,993, Apr. 12, 1994, abandoned.

[51] Int. Cl.⁶ ............................. C09D 11/02; C03C 17/00
[52] U.S. Cl. ..................... 523/160; 106/20 D; 106/23 R; 106/22 D; 106/22 H; 524/556
[58] Field of Search ..................... 524/502, 556, 524/809, 808, 832, 833; 523/160, 161

[56] References Cited

U.S. PATENT DOCUMENTS

| | | |
|---|---|---|
| 273,240 | 2/1883 | Kendall . |
| 3,470,200 | 9/1969 | Anderson . |
| 3,705,043 | 12/1972 | Zabiak . |
| 3,951,892 | 4/1976 | Drury et al. . |
| 4,066,585 | 1/1978 | Schepp et al. . |
| 4,155,768 | 5/1979 | Adams et al. . |
| 4,163,675 | 8/1979 | Hirano et al. . |
| 4,197,135 | 4/1980 | Bailey et al. . |
| 4,260,531 | 4/1981 | Wachtel . |
| 4,365,035 | 12/1982 | Zabiak . |
| 4,465,800 | 8/1984 | Bhatia . |
| 4,471,079 | 9/1984 | Enami . |
| 4,545,818 | 10/1985 | Inoue et al. . |
| 4,567,213 | 1/1986 | Bhatia et al. . |
| 4,597,794 | 7/1986 | Ohta et al. . |
| 4,756,758 | 7/1988 | Lent et al. . |
| 4,791,165 | 12/1988 | Bearss et al. . |
| 4,880,465 | 11/1989 | Loria et al. . |
| 4,883,714 | 11/1989 | Stockl et al. . |
| 4,961,785 | 10/1990 | Skene et al. . |
| 4,973,499 | 11/1990 | Iwata et al. . |
| 5,106,417 | 4/1992 | Hauser et al. ..................... 106/20 R |
| 5,108,505 | 4/1992 | Moffat . |
| 5,141,556 | 8/1992 | Matrick et al. . |
| 5,162,399 | 11/1992 | Sharma et al. . |
| 5,164,232 | 11/1992 | Henseleit et al. . |
| 5,166,245 | 11/1992 | Zuraw . |
| 5,211,747 | 5/1993 | Breton et al. . |
| 5,221,334 | 6/1993 | Ma et al. . |
| 5,242,489 | 9/1993 | Schwarz, Jr. . |
| 5,244,496 | 9/1993 | Easton et al. . |
| 5,275,646 | 1/1994 | Marshall et al. . |
| 5,288,160 | 2/1994 | Li et al. . |
| 5,298,535 | 3/1994 | Kammer ............................ 524/190 |
| 5,316,575 | 5/1994 | Lent et al. . |
| 5,395,431 | 3/1995 | Siddiqui et al. . |
| 5,431,720 | 7/1995 | Nagai et al. . |
| 5,441,561 | 8/1995 | Akihiko Chujo et al. ........... 106/20 C |

FOREIGN PATENT DOCUMENTS

| | | |
|---|---|---|
| 0 044 378 | 1/1982 | European Pat. Off. . |
| 223501 | 11/1986 | European Pat. Off. . |
| 56147860 | 11/1981 | Japan . |

OTHER PUBLICATIONS

Carboset® Bulletin CRX–8 (B.F. Goodrich).
Carboset® Sales Brochure (B.F. Goodrich).
Kirk–Othmer, "Encyclopedia of Chemical Technology," Third Edition, vol. 13, pp. 374–398 (inks).

*Primary Examiner*—Christopher Henderson
*Attorney, Agent, or Firm*—Dianne E. Reed; Bozicevic & Reed

[57] ABSTRACT

Water-based, water-fast ink compositions are provided. The compositions contain an aqueous liquid vehicle, a colorant, e.g., a pigment, dye or stain, and a binder material capable of ionically or physically entrapping the selected colorant. Certain novel polymers are provided as well.

8 Claims, No Drawings

AQUEOUS INK COMPOSITIONS CONTAINING A BINDER OF A NEUTRALIZED ACIDIC RESIN

CROSS-REFERENCE TO RELATED APPLICATIONS

This application is a continuation-in-part of U.S. patent application Ser. No. 08/225,993, filed Apr. 12, 1994, now abandoned. The disclosure of that application is hereby incorporated by reference in its entirety.

TECHNICAL FIELD

The present invention relates generally to ink compositions, and more particularly relates to novel water-based, water-fast ink compositions. The invention additionally concerns novel polymers useful for formulating the disclosed water-based ink compositions.

BACKGROUND

Concern for the environment as well as increasingly stringent regulation of air quality, pollution and hazardous waste has created a need for alternatives to the use of petroleum and petroleum-based products in ink compositions. The primary focus has been on the development of water- and soy-based printing inks. The major reason for using water-based ink compositions is that because organic solvents are not present except in very small quantities, potential problems such as toxicity, flammability and other hazards are minimized. The major drawback of the currently available water-based inks, however, is their generally poor water fastness, which limits their utility.

The present invention is addressed to the aforementioned limitation in the art, and provides a water-based ink composition which is also water-fast. That is, the ink compositions are prepared in water, substantially without toxic and/or hazardous organic solvents, but after printing and drying become insoluble in water and many of the common organic solvents as well.

The novel ink compositions are advantageous in other ways as well. In contrast to many ink compositions of the prior art, the compositions of the invention may be used on a wide variety of substrates, dry quickly after application, and tend not to bleed or smear after drying. In addition, the present ink compositions are generally low in viscosity (and thus relatively easy to work with), display good soak resistance, and have a relatively long shelf life, typically on the order of a year or more.

Traditional water-based inks are based on resin systems which are dispersed in water. Several references describe inks which are based on aqueous vehicles. U.S. Pat. No. 5,106,417 to Hauser et al., for example, describes low viscosity aqueous printing ink compositions based on polyacrylic resins containing carboxyl groups, and which also contain a humectant, pigment and, optionally, a water-dilutable organic solvent. U.S. Pat. No. 5,166,245 to Zuraw et al. describes water-based printing inks made with modified rosin grinding resins. U.S. Pat. No. 5,242,489 to Schwarz, Jr., et al., describes an ink composition containing a polymeric additive in addition to a colorant and an aqueous liquid vehicle. U.S. Pat. No. 5,244,496 to Easton et al. describes a water-fast ink composition containing an amine, an acrylic emulsion resin binder, a triamine dye, and water. However, the water-based inks disclosed in these references do not provide the aforementioned advantages of the invention; primarily, these inks of the prior art are not both water soluble and water-fast.

OVERVIEW OF RELATED ART

In addition to the publications cited in the preceding section, the following references are of interest as they relate to ink compositions based on aqueous liquid vehicles:

U.S. Pat. No. 3,951,892 to Drury et al., which describes a fountain ink composition containing an aqueous dispersion of a styrene polymer and a colorant;

U.S. Pat. No. 4,066,585 to Schepp et al., which describes solvent-free printing inks for intaglio or flexographic printing based on synthetic resins such as polyamides or polyester amides, and are solid at room temperature but used at temperatures at which the compositions melt and flow;

U.S. Pat. No. 4,155,768 to Adams et al., which describes an ink composition for use in ink jet comprising an aqueous solution of a water soluble dye in a polyamine, and having a pH of 8 or lower;

U.S. Pat. No. 4,163,675 to Hirano et al., which relates to an ink composition containing water, a water soluble dye, a naphthalene derivative which is present at about 0.1 to 10% by weight, and, optionally, a glycol or polyglycol constituent as a moisture-retaining agent;

U.S. Pat. No. 4,197,135 to Bailey et al., which describes an alkaline ink composition stated to be water-fast and useful in ink jet printer applications, wherein the composition is an aqueous solution having a pH of 8 or higher, and contains a water soluble dye and a polyamine having seven or more nitrogen atoms per molecule;

U.S. Pat. No. 4,365,035 to Zabiak, which describes a water-based ink composition having an acrylic resin, an inorganic pigment, a solvent (e.g., low boiling alcohol, or water-alcohol mixture), a basic compound dissolved in the solvent (e.g., ammonium hydroxide), and a plasticizer;

U.S. Pat. No. 4,545,818 to Inoue et al., which generally describes a water-based ink composition containing a water soluble or water-dispersible colorant, a hygroscopic wetting agent (e.g., dihydric alcohol, polyhydric alcohol, pyrrolidone or urea), xanthan gum and, optionally, an organic solvent drying agent (e.g., a glycol ether);

U.S. Pat. No. 4,756,758 to Lent et al., which describes thermochromic jet ink compositions which are formulated to contain two different dyes and having a resin such as a phenolic resin, a solvent liquid carrier system (e.g., based on a lower aliphatic alcohol and a lower aliphatic branched ketone) and, optionally, surfactants, plasticizers or the like, and wherein the compositions have a viscosity from 1.6 to 7.0 centipoises (cP) at 25° C., an electrical resistivity from about 50 to 2000 ohm-cm and a sonic velocity from about 1200 to about 1300 meters/second;

U.S. Pat. No. 4,791,165 to Bearss et al., which describes a water-fast and lightfast ink composition having a hygroscopic component (e.g., glycol), water, a polymer blend and a dye;

U.S. Pat. No. 4,883,714 to Barton et al., which describes a flexographic printing ink composition containing polyester materials, polyvinyl alcohol and pigment;

U.S. Pat. No. 5,108,505 to Moffatt, which describes ink containing a cyclodextrin to solubilize a water-insoluble dye in a water-based ink;

U.S. Pat. No. 5,162,399 to Sharma et al., which describes a method for making ink millbase using a water-dispersible polyester in combination with an acrylic polymer;

U.S. Pat. No. 5,221,334 to Ma et al., which relates to a pigmented ink composition for ink jet printers wherein the composition is formed from an aqueous carrier medium and insoluble colorants dispersed in an AB or BAB block copolymer having a hydrophilic segment;

U.S. Pat. No. 5,275,646 to Marshall et al., which relates to ink-jet ink compositions which are stated to be free of volatile solvents and formulated to include a mixture of colorant, a water soluble polar conductive material and liquid phase, and, optionally, stabilizers, surfactants and wetting agents;

U.S. Pat. Nos. 5,288,160 to Li et al., which discloses an ink composition having a pH in the range of approximately 8 to 10, and which contains, among other components, an acrylic resin and a pigment;

U.S. Pat. No. 5,316,575 to Lent et al., which relates to jet printing ink compositions containing a resin, a colorant, and other optional components, wherein the compositions are stated to be "substantially free of volatile organic components" and, like the ink compositions in U.S. Pat. No. 4,756,758 to Lent et al. summarized above, have a viscosity from 1.6 to 7.0 centipoises at 25° C., an electrical resistivity from about 50 to 2000 ohm-cm and a sonic velocity from about 1200 to about 1300 meters/second;

European Patent Publication No. 223,501, which describes a water-based ink compositions containing water and the reaction product of a water soluble polymer such as a polyethyleneimine with a reactive chromophore; and Japan Kokai Publication No. 56147860, which describes inks containing pigments, polymer dispersing agents and 1,3-dimethyl-2-imidazolidinone in aqueous media.

SUMMARY OF THE INVENTION

It is accordingly a primary object of the invention to address the above-mentioned need in the art by providing a novel water-based ink composition which is also water-fast.

It is another object of the invention to provide such a composition using a binder material that serves to entrap the selected colorant and is preferably biocompatible.

It is still another object of the invention to provide such a composition wherein the binder material comprises a single polymeric resin containing both positively and negatively charged species.

It is yet another object of the invention to provide such a composition wherein the binder material comprises two or more species which in combination serve to entrap the selected colorant.

It is a further object of the invention to provide such a composition wherein the binder material comprises: (a) two polymeric species; (b) two monomeric species; or (c) a polymeric and a monomeric species.

It is still a further object of the invention to provide such a composition in the form of a jet printing ink.

It is yet a further object of the invention to provide such a composition in the form of an ink suitable for use with personal computer-associated printers (i.e., "pc printing" compositions).

It is another object of the invention to provide such a composition in the form of a flexographic ink.

It is still an additional object of the invention to provide such a composition in the form of a lithographic ink.

It is yet an additional object of the invention to provide such a composition in the form of a screen printing ink.

It is also an object of the invention to provide novel polymers useful in conjunction with the present water-based, water-fast ink composition.

Additional objects, advantages and novel features of the invention will be set forth in part in the description which follows, and in part will become apparent to those skilled in the art upon examination of the following, or may be learned by practice of the invention.

In a first embodiment, the invention relates to a novel ink composition useful in a variety of printing contexts, e.g., it may be used as a jet printing, pc printing, flexographic, lithographic or screen printing ink. The composition comprises components which are soluble in water, or readily rendered soluble in water by addition of a suitable reagent. Accordingly the ink formulation may be prepared in water without need for organic solvents, but is insoluble in water after drying on a substrate.

The binder material of the ink formulation may comprise a single polymeric material, two or more polymeric materials in combination, a single monomeric material, or two or more monomeric materials in combination, provided that the materials are such that the selected colorant is either ionically or physically entrapped thereby. For example, a first polymeric material bearing negative charges may be used in combination with a second polymeric material bearing positive charges, so as to form a polymeric network in which a colorant having both positive and negative charges is ionically entrapped. Similarly, a first monomeric acidic material, e.g., citric acid or the like, may be used in combination with a second monomeric basic material, e.g., a simple diamine or triamine, so as to form a binder material in the form of a network which, similarly, entraps the colorant either ionically, physically, or both.

In another embodiment, the invention provides novel polymers useful in the present water-based ink compositions. A first group of these resins, designated herein as Group A, contain hydrophobic segments and ionic segments which are preferably although not necessarily distinct and nonidentical. Group A resins comprise first mer units having the structural formula (I) and second mer units having the structural formula (II)

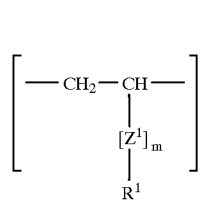

(I)

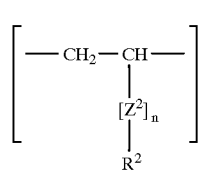

(II)

wherein $R^1$ is a hydrophobic moiety, $R^2$ is an ionic group, $Z^1$ and $Z^2$ are linking moieties, and m and n are independently 0 or 1. These resins may contain additional units having the structural formula (III)

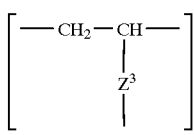

(III)

where $Z^3$ provides for intramolecular cross-linking as will be explained below.

A second group of novel polymers includes resins which are structurally distinguishable from the aforementioned Group A resins, but are similar insofar as they also include hydrophobic segments and ionic segments. For convenience, these novel polymers are termed Group B resins herein, and may be defined as comprising first mer units having the structural formula (IVa) and/or (IVb) and second mer units containing pendant carboxylic acid, phosphonic acid or sulfonic acid groups or sulfonate groups neutralized with ammonia and/or other amine-containing moieties, such second mer units typically having the structural formula (V)

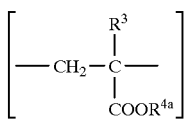

(IVa)

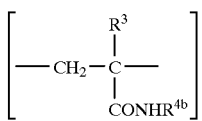

(IVb)

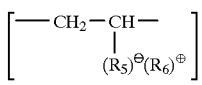

(V)

In formulae (IVa) and (IVb), R3 is hydrogen or lower alkyl, while $R^{4a}$ and $R^{4b}$ are alkyl, with $R^{4a}$ preferably being lower alkyl. In formula (V), $R^5$ is an anionic species selected from the group consisting of carboxylate, phosphate and sulfonate, and $R^6$ is a cationic species, typically a quaternary ammonium moiety, e.g., imidazolyl, $NR^7_4{}^+$, or the like, wherein the $R^7$ moieties may be the same or different and are, for example, hydrogen or lower alkyl. $R^6$ may be associated with a polymer; for example, it may represent a nitrogen atom in either the backbone of a polymer or a pendant group of a polymer. $R^6$ may also represent a nitrogen atom in a diamine cross-linking group, such that $R^6$ provides for linkage to another segment of the resin in an intramolecularly crosslinked network. As with the former group of resins, this group also can include additional mer units having the structural formula (III).

Group C resins, the third group of novel polymers herein, comprise first mer units having the structure (VI) and second mer units having the structure (VII) and/or (VIII)

 (VI)

 (VII)

 (VIII)

wherein, in structure (VII), $R^8$ represents hydrogen, alkyl of 3 to 16 carbon atoms, or lower acyl —(CO)—$R^9$ where $R^9$ is lower alkyl.

Group D resins, the fourth group of novel polymers herein, have backbones containing a polyethylene glycol moiety and mer units having the structures (IX), (X), (XI) or combinations thereof.

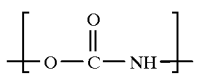

(IX)

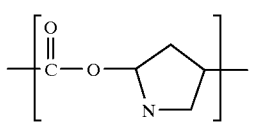

(X)

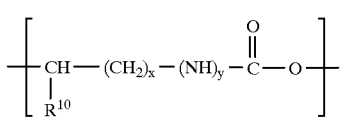

(XI)

In these structures, $R^{10}$ is —COOH or —NH$_2$, x is 0 to 4, and y is 0 or 1. Specific examples of such polymers will be detailed below.

The resins of Groups A, B, C and D are novel polymers which find utility in a variety of contexts, but have been found to be particularly suitable in conjunction with the preparation of water-based inks, such as those provided herein.

The ink compositions of the invention provide a number of advantages. Specifically, the novel ink compositions:

- may be prepared in water, but are water-fast once applied to a substrate and allowed to dry;
- are indelible with respect to other liquids as well, including alkaline solutions, detergents, and organic solvents such as alcohols, acetone and toluene;
- may be used on a wide variety of substrates, including cellulosic materials, glass and many types of plastic;
- dry very quickly after application, taking only a few minutes, and tend not to bleed, smear or rub after drying;
- are relatively simple to manufacture;
- display good soak resistance;
- may be readily tailored with respect to variables such as viscosity, surface tension, dielectric constant and color density by varying the amount or type of resin or additives used;
- may also be tailored with respect to end use, i.e., as jet printing inks, pc printing inks, or the like;
- are not flammable;
- are not harmful to the environment; and
- are thermally stable up to temperatures of at least about 150° C.–200° C.

It will be appreciated by those skilled in the art that the compositions of the invention may provide for other advantages also, depending on the exact choice and relative amounts of the components used as well as on the intended use of the compositions.

DETAILED DESCRIPTION OF THE INVENTION

Definitions and Nomenclature

Before the present compounds, compositions and methods are disclosed and described, it is to be understood that the terminology used herein is for the purpose of describing particular embodiments only and is not intended to be limiting.

It must be noted that, as used in the specification and the appended claims, the singular forms "a", "an" and "the" include plural referents unless the context clearly dictates otherwise. Thus, for example, reference to "a resin" includes mixtures of resins, reference to "a polymer" includes mixtures of polymers, reference to "a colorant" includes mixtures of two or more colorants, and the like. Also, it should be noted that reference to "a mer unit" having a particular generic structure includes reference to two or more mer units which may or may not have the same specific structure.

In this specification and in the claims which follow, reference will be made to a number of terms which shall be defined to have the following meanings:

The term "water-soluble" as used herein to describe the nature of the ink composition prior to drying on a substrate is intended to mean that the composition dissolves virtually completely. Generally, this will mean that the solubility of the composition is at least about 0.5 mg/ml in water.

The term "water-fast" as used herein to describe the nature of the ink composition after drying on a substrate is intended to mean that the dried composition is insoluble (less than about 1 mg/ml) in water.

The term "biocompatible" to describe the preferred ink compositions of the invention is used to mean that the components of the compositions do not degrade or otherwise adversely affect biological materials in any significant way.

The term "organic solvent" is used herein in its conventional sense to refer to a liquid organic compound, typically a monomeric organic material in the form of a liquid, preferably a relatively nonviscous liquid, the molecular structure of which contains hydrogen atoms, carbon atoms, and optionally other atoms as well, and which is capable of dissolving solids, gases or liquids. The present ink formulations are "substantially free" of organic solvents, i.e., they contain less than about 5.0 wt. % organic solvents, more preferably less than about 3.0 wt. % organic solvents, and most preferably are completely free of organic solvents. However, materials classified as organic solvents in this way may be included in the composition in greater quantities if all such solvent present physically interacts with, chemically reacts with, and/or neutralizes the binder material such that it becomes part of the binder/colorant matrix upon drying on a substrate, so that the presence of any such solvent in free, unassociated form is minimal, i.e., within the aforementioned limited ranges.

The term "entrapped" is used herein to refer to the manner in which colorant is bound by the binder material. The colorant may be ionically associated with the binder material (and thus "ionically entrapped" as the term is used herein), i.e., wherein ionizable or ionized species present on the colorant bind to corresponding species on the binder material. Alternatively, the colorant may be "physically entrapped" by the binder, i.e., physically retained by a matrix, such as a matrix of two or more polymeric materials. In either case, "entrapment" is such that after the ink composition dries on a substrate, leaching of colorant from the binder material does not occur.

The term "volatile" is used herein to describe certain types of neutralizing agents useful in conjunction with the present ink compositions. The term is used in its conventional sense to refer to a liquid compound which readily vaporizes, has a relatively low boiling point or subliming temperature at atmospheric pressure, and has a relatively high vapor pressure at room temperature. Generally, such compounds will have a boiling point of less than about 20° C., preferably less than about 0° C., at atmospheric pressure, and a vapor pressure of at least about 500 kPa and preferably at least about 750 kPa at room temperature. Examples of particularly preferred "volatile" neutralizing agent are ammonia and methylamine. The term "nonvolatile" as used herein to refer to certain other neutralizing agents is intended to mean agents which cannot be classified as "volatile" as just described. Such agents may be liquids or solids. An example of a particularly preferred "nonvolatile" neutralizing agent is imidazole.

The term "hydrophobic" refers to a tendency not to associate with water. The term is used herein to refer to certain substituents in a relative sense, i.e., by identifying the substituent $R^1$ as "hydrophobic," it is meant that $R^1$ is hydrophobic relative to other portions of the molecular structure containing the substituent.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms. The term "lower alkyl" is intended to mean an alkyl group of one to six carbon atoms, preferably one to four carbon atoms.

The term "alkoxy" as used herein refers to an alkyl group bound through an oxygen atom, e.g., methoxy, ethoxy, or the like. The term "lower alkoxy" is intended to mean an alkoxy group of one to six carbon atoms, preferably one to four carbon atoms.

The term "alkylene" as used herein refers to a difunctional saturated branched or unbranched hydrocarbon chain containing from 1 to 24 carbon atoms, and includes, for example, methylene ($—CH_2—$), ethylene ($—CH_2—CH_2—$), propylene ($—CH_2—CH_2—CH_2—$), 2-methylpropylene [$—CH_2—CH(CH_3)—CH_2—$], hexylene [$—(CH_2)_6—$] and the like. "Lower alkylene" refers to an alkylene group of 1 to 6, more preferably 1 to 4, carbon atoms.

The term "acyl" is used herein in its conventional sense to refer to an alkyl group bound through a carbonyl moiety, i.e., $—(CO)—R$ where R is alkyl as defined above. The term "lower acyl" is used to refer to an acyl group wherein "R" is lower alkyl.

"Optional" or "optionally" means that the subsequently described event or circumstance may or may not occur, and that the description includes instances where said event or circumstance occurs and instances where it does not. For example, the phrase "optionally substituted heterocyclic group" means that a heterocyclic group may or may not be substituted and that the description includes both unsubstituted heterocyclic groups and heterocyclic groups where there is substitution.

The Novel Ink Compositions

The aqueous ink compositions of the invention accordingly comprise an aqueous liquid vehicle, an effective amount of a colorant, and a binder material adapted to ionically or physically entrap the colorant. The binder material may be a single polymer, a mixture of two or more polymers, a mixture of a monomer and a polymer, or a mixture of two or more monomers.

In one embodiment, the binder material is a single polymeric material comprising a resin which is water soluble in its "free" state or which is readily rendered water soluble by admixture with a suitable neutralizing reagent. However, when admixed with water at room temperature, the resin becomes insoluble in water after drying on a substrate. The composition has a pH in the range of approximately 3 to 12.5, preferably in the range of approximately 4 to 9, and most preferably in the range of 5 to 8. Although the ink compositions are primarily useful for ink jet printing, they may be used in a variety of other contexts as well, as will be explained below.

Generally, in this embodiment, when a single polymeric material is used as the binder material, it is preferred that the polymer be provided with acidic or basic groups, preferably acidic groups, which may be readily neutralized with a suitable neutralizing composition effective to render the polymer water soluble. For example, the polymer may contain carboxylic acid groups which may then be neutralized with a base such as ammonia, a lower alkyl substituted amine, a polymeric amine, a heterocylic amine such as imidazole, or a combination of such reagents. In a particularly preferred embodiment, neutralization of a polymer bearing acidic groups is first conducted with a volatile neutralizing agent effective to produce a solution of approximately 1 to 50 wt. %, more preferably 5 to 30 wt. %, and most preferably 10 to 20 wt. % of the resin in water; examples of such volatile neutralizing agents are ammonia and methylamine. This procedure is then followed by further neutralizing the polymer with a nonvolatile organic base, e.g., imidazole or an alternative amine as described above. The amount and type of nonvolatile organic base is such that the polymer remains in solution upon volatilization of the initial neutralizing agent but which, after the ink composition has been deposited on and allowed to dry on a substrate, does not render the dried deposit soluble when water is applied thereto. Generally, between about 0.01% and 100% and preferably between about 10% to 100% of acidic groups will be neutralized. In some cases, however, neutralization will not be necessary, i.e., when the polymer is water soluble. Further discussion of suitable binder materials is presented in detail hereinbelow.

The aqueous liquid vehicle will generally be deionized water, although other nonorganic compounds which are either water soluble or water miscible may be included as well. Generally, an inorganic base such as ammonia or an organic amine (e.g., a lower alkyl amine) is added to bring the pH into the desired range. Where a neutralizing composition is used comprising such a reagent, the composition serves a dual purpose, i.e., to render the binder material water soluble and to adjust the pH of the ink composition upward.

The colorant may be any pigment, dye or stain which may be dissolved, dispersed or suspended in the aqueous liquid vehicle and which is effective to provide the dried ink with the desired color and color intensity. Colorants which tend to be immobilized on the selected resin, e.g., through covalent or ionic attachment, are preferred. Such colorants include azo or "direct" dyes as well as dyes containing acidic groups (e.g., carboxylate, phosphonate or sulfonate moieties), basic groups (e.g., amine salts), or both. In any case, the colorant and the binder material should be selected so that in combination, the colorant becomes entrapped by the binder.

Specific examples of suitable colorants include: Dispersol Blue Grains (Zeneca, Inc.), Duasyn Acid Blue (Hoechst Celanese), Duasyn Direct Turquoise Blue (Hoechst Celanese), Phthalocyanine blue (C.I. 74160), Diane blue (C.I. 21180), Pro-jet Cyan 1 (Zeneca, Inc.). Milori blue (an inorganic pigment equivalent to ultramarine) as cyan colorants; Dispersol Red D-B Grains (Zeneca, Inc.), Brilliant carmine 6B (C.I. 15850), Pro-jet magenta (Zeneca, Inc.), Brilliant Red F3B-SF (Hoechst Celanese), Red 3B-SF (Hoechst Celanese), Acid Rhodamine (Hoechst Celanese), Quinacridone magenta (C.I. Pigment Red 122) and Thioindigo magenta (C.I. 73310) as magenta colorants; Dispersol Yellow D-7G 200 Grains (Zeneca, Inc.), Brilliant yellow (Hoechst Celanese), Pro-jet yellow 1 (Zeneca, Inc.), benzidine yellow (C.I. 21090 and C.I. 21100) and Hansa Yellow (C.I. 11680) as yellow colorants; organic dyes; and black materials such as carbon black, charcoal and other forms of finely divided carbon, iron oxide, zinc oxide, titanium dioxide, and the like. Specific and preferred black colorants include Acid Black 48 (Aldrich), Direct Black 58756 A (Crompton & Knowles), BPI Molecular Catalytic Gray (Brain Power), Fasday Cool Gray (Hunter Delator), Dispersol Navy XF Grains (Zeneca, Inc.), Dispersol Black CR-N Grains (Zeneca, Inc.), Dispersol Black XF Grains (Zeneca, Inc.), Hostafine Black TS (Hoechst Celanese), Hostafine Black T (Hoechst Celanese), Duasyn Direct Black (Zeneca), Pro-jet Black 1 (Zeneca, Inc.) and Pro-jet Fast Black 2 (Zeneca, Inc.).

Generally, it is preferred that the colorant be present in an amount ranging from about 0.1 wt. % to about 20 wt. % of the ink composition, more preferably from about 1 wt. % to about 10 wt. % of the ink composition, and most preferably from about 1 wt. % to about 5 wt. % of the ink composition.

The binder material, in a first embodiment, comprises a single polymeric material. The material may be any one of the above-mentioned polymers in Groups A, B, C or D, which will be described in further detail in the following section, or it may be a known resin which functions in an equivalent manner, i.e., to entrap the colorant, either physically or through ionic interaction. Any such resin, also, should be selected such that it is soluble in water or readily rendered soluble in water by addition of a suitable neutralizing agent, but is water-fast after being applied to a substrate and allowed to dry. Preferably, the resin is also selected such that it is biocompatible.

Commercially available polymeric materials which may be used include, but are not limited to, polyethyleneimine, polyvinylpyrrolidone, polyoxazoline, polyvinylpyridine, polyallylamine (including N-alkylated and N,N-dialkylated polyallylamines), polyvinylaziridine, polyimidazole, polylysine, alginic acid, chitin, chitosan, poly(amino and alkylated amino)ethylenes and ethoxylated polyethyleneimine.

In general, the molecular weight of any polymeric material used in the present ink formulations will be between about 300 and 150,000, and preferably between about 300 and 100,000, although smaller and larger molecular species may be used depending on the application.

As explained above, the binder material can comprise not only a single polymeric material but also a mixture of two or more polymeric materials, preferably although not necessarily Group A, B, C or D resins, so as to produce an interpolymer matrix. The only requirement here with respect to the polymers selected and the relative quantities used is that ionic or physical entrapment of colorant be such that colorant leaching is precluded. In a preferred embodiment, when a mixture of polymeric materials is used, one polymer has acidic groups, e.g., carboxylic acid groups, and a second polymer has basic groups, e.g., ionized amine moieties. Examples of suitable combinations include, for example, polyethyleneimine, N-alkylated polyethyleneimine, polyimidazole or polyvinylpyridine in combination with an acrylate copolymer such as acrylamide acrylic acid, acrylonitrile acrylic acid, styrene acrylic acid, or the like.

In another embodiment, the binder material comprises a mixture of monomeric species which in combination act to ionically or physically entrap the colorant. In such a case, a first monomeric species is used which is acidic, and a second monomeric species is used which is basic. Again, the only limitation on the particular species selected is that the combination provide for complete entrapment of colorant such that there is no leaching after the ink has been applied to and allowed to dry upon a substrate. Preferred acidic materials in this embodiment contain two or more acidic groups, e.g., citric acid, tartaric acid, glutaric acid, gluconic acid, and benzene tetracarboxylic acid. Monoacids may be used, but should be combined with di- or polyacids. Similarly, preferred basic materials in this embodiment contain two or more basic groups, e.g., diamines, polyamines and the like. Examples of particularly preferred bases include hexamethylene tetraamine, triethylene tetraamine, ethylene diamine, diethylene triamine, tetraethylene pentamine, pentaethylene hexamine, tris(2-aminoethyl)amine, 1,1,4,7,10,10-hexamethyltriethylene tetramine and N-alkylated as well as N,N-dialkylated substituted amines. If desired, combinations of acids may be used, as may combinations of bases.

Finally, a single polymeric material may be used in conjunction with a single monomeric material, again, with the materials selected such that the two components are together capable of providing a matrix which entraps the colorant. When the polymer contains acidic groups, the monomeric material will contain basic groups, and vice versa. The polymer can be any one of the resins of Groups A through D, or it may be a functionally equivalent material.

The ink compositions of the invention may contain other components as well. A preferred additive is urea or an alkyl-substituted urea, which may be substituted for one or more of the above-mentioned bases, or it may be used in conjunction therewith. Additionally, it may be preferable in some cases to include a humectant. Suitable humectants include, for example, triacetin, N-methyl-2-pyrrolidone, and glycerol. It may also be preferable to include anti-foaming agents with certain compositions; examples of suitable anti-foaming agents include 1-dodecyl alcohol, Silicon Antifoam 85390 (Fluka), Surfynol DF75 (Air Products), Surfynol DF210 (Air Products), Carboflow 32W (B.F. Goodrich), Tego Airex 900 (TegoChemie USA), TegoFoamex 1488 (TegoChemie USA), Siliconantifoamer S670 (Wacker) and Foam Blast 338 (Ross Chemicals). Other additives include viscosity modifiers, surface tension control agents such as anionic and nonionic surface active agents, preservatives and biocides. It may also be desirable in some cases to include cross-linking agents such as imidazole, substituted imidazoles, polyethyleneimines, polyvinylimidazole, polyvinylpyridine, and polyaminosiloxanes. Finally, it may also be preferred in some cases to include polyethylene glycol (PEG) when the composition is formulated for jet printing. Incorporation of PEG in the present ink formulations lowers surface tension, improves water fastness, and reduces the likelihood that the ink will dry on the jet printing nozzle. When PEG is included in the ink formulation, it should represent on the order of 0.1 to 20 wt. % of the formulation, more preferably 0.1 to 10 wt. % of the formulation, and most preferably approximately 6.0 wt. %.

However, even though the ink composition may contain these additional components, it is strongly preferred that for jet printing inks, the binder, colorant and water that are present should in combination represent at least about 90 wt. % of the composition. Also, the composition may contain very small amounts of monomeric organic solvents, e.g., lower alcohols or the like. Any such solvents should be present in an amount that is less than about 5 wt. %, preferably less than about 3 wt. %, of the ink composition. However, if a monomeric solvent is included in the composition which physically interacts or chemically reacts with the binder material so as to form part of the binder/colorant matrix which forms the substance of the dried ink composition, somewhat more solvent may be included.

Novel Polymeric Structures

As noted above, a number of polymers useful in conjunction with the present ink compositions are new. The polymers of Groups A and B, as defined above, contain hydrophobic segments and ionic segments which are typically although not necessarily distinct and nonidentical.

With regard to Group A resins, such polymers contain first mer units having the structural formula (I) and second mer units having the structural formula (II), wherein $R^1$, $R^2$, $Z^1$, $Z^2$, m and n are as defined earlier herein.

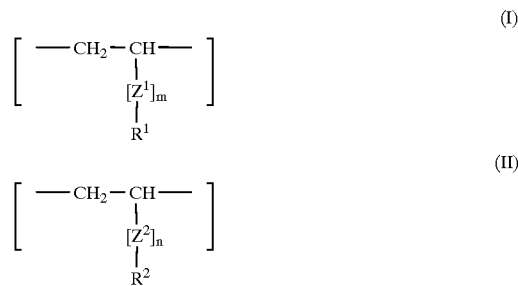

Preferably, $R^1$ is a hydrophobic moiety selected from the group consisting of: cyano; lower alkyl esters; unsubstituted monocyclic five- and six-carbon aromatic moieties; monocyclic five- and six-carbon aromatic moieties substituted with 1 to 4 substituents selected from the group consisting of lower alkyl, lower alkoxy, halogen and nitro; unsubstituted monocyclic five- and six-carbon heterocyclic moieties containing 1 to 3 heteroatoms; and monocyclic five- and six-carbon heterocyclic moieties containing 1 to 3 heteroatoms and 1 to 4 substituents selected from the group consisting of lower alkyl, lower alkoxy, halogen and nitro. Examples of particularly preferred groups suitable as $R^1$ include imidazolyl and pyrrolidinyl, either unsubstituted or substituted with one or more substituents, e.g., carboxylate-, sulfonate- or phosphate-substituted lower alkylene groups, lower alkyl, lower alkoxy, or the like.

$R^2$ represents a salt moiety —$W^+X^-$ or $Y^-Z^+$ or a zwitterionic species —$A^+$—$L^1$—$B^-$ or —$C^-$—$L^2$—$D^+$ wherein W, Z, A and D are independently either imidazolyl or a quaternary ammonium moiety optionally substituted with alkyl groups, preferably lower alkyl groups, and further wherein Z may be a metallic cation such as sodium, lithium, or the like, X, Y, B and C are selected from the group consisting of carboxylate, phosphate and sulfonate, and $L^1$ and $L^2$ are alkylene linking moieties. Examples of ionic species include, for example, —$COO^-Z^+$, —$P(O)O_2^{2-}Z^{2+}$, —$SO_3^-Z^+$, —$NH_4^+X^-$, —$CH_2$—$NR_3^+X^-$, and

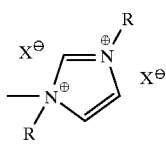

where R is generally hydrogen or lower alkyl, while zwitterionic species include, for example,

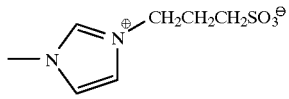

The linking groups $Z^1$ and $Z^2$ are optional, as may be deduced from the definition of the subscripts "m" and "n," i.e., they may be zero or one. If present, $Z^1$ and $Z^2$ are independently selected from the group consisting of arylene, optionally containing 1 to 3 heteroatoms, $C_6$–$C_{18}$ aralkylene, $C_1$–$C_{12}$ alkylene, —CO—, —COO—, —CONH— and —NHCO—. Lower alkylene and amide linkages are particularly preferred.

Such resins may contain two or more different structural units encompassed by the genus of formula (I), and/or two or more different structural units encompassed by the genus of formula (II). The resins may also include additional vinyl-based mer units having the structural formula (III)

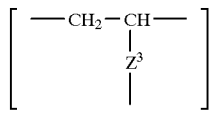

(III)

wherein $Z^3$ is a cross-linking moiety promoting intramolecular cross-linking of the resin, such that it is bound to another vinyl unit within the same resinous species. $Z^3$ may be a siloxane or polysiloxane moiety, a silazane or polysilazane moiety, or a diamine —NR—$Z^4$—NR— where, as before, R is hydrogen or lower alkyl and $Z^4$ is an optional linking moiety, typically lower alkylene.

Examples of specific such resins include the following:

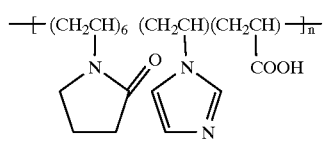

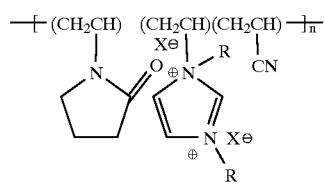

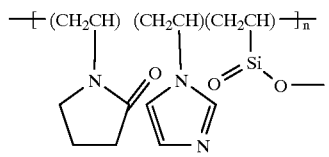

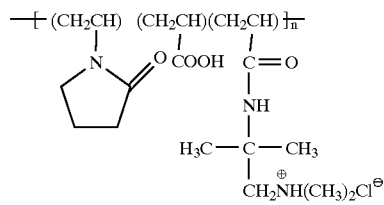

-continued

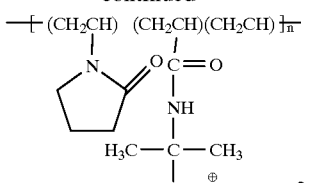

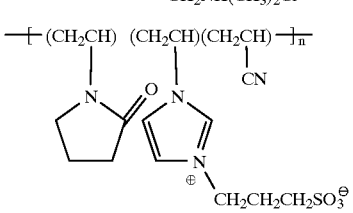

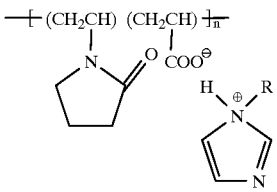

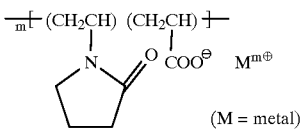

(M = metal)

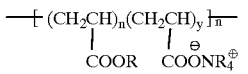

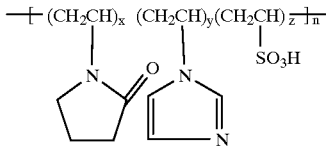

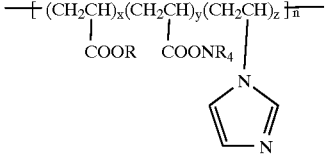

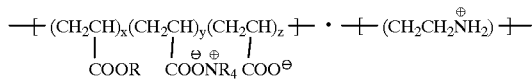

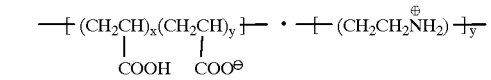

A second group of novel polymers (Group B) again, contain first mer units having the structural formula (IVa) and/or (IVb) and second mer units containing pendant carboxyl, phosphate and/or sulfonate groups (exemplified by structure (V)). The acidic groups present in these latter mer units are preferably neutralized as described above so as to provide the substituent $R^6$; that is, neutralization is carried out using ammonia and/or an amine such as a lower alkyl amine (mono-, di- or trisubstituted), a diamine of the formula $H_2N$—$R^8$—$NH_2$ where $R^8$ is lower alkylene or arylene, a monomeric polyamine, a polymeric amine or imine (e.g., polyethyleneimine), a heterocyclic amine such as imidazole, or a combination of two or more of the foregoing. Examples of particularly suitable amines include imidazole, 4,4'-bipyridyl, tetramethyl-p-phenylenediamine, tetramethylethylenediamine and triethylenetetraamine.

For example, the polymers of Group B may be treated as described in the preceding section with respect to acidic binding materials in general, i.e., they may be neutralized initially with a volatile neutralizing agent base such as ammonia so as to render ionic a fraction of the carboxylic acid, phosphonic acid and/or sulfonic acid groups, followed by further neutralization with a nonvolatile organic base, e.g., a lower alkyl substituted amine, a diamine, a mono-, di- or triethanolamine, a polymeric amine or imine, morpholine, N-methylmorpholine, or other heterocyclic amines such as imidazole. Again, between about 0.01% and 100% and preferably between about 10% to 100% of the pendant carboxylic acid, phosphonic acid and/or sulfonic acid groups may be neutralized in this manner, with the desired fraction of neutralized acidic groups, as noted above, dependent on the polymer and its solubility in water. With polymers that are more water soluble, fewer acidic groups need to be neutralized, while with polymers that are less soluble in water, more acidic groups will need to be neutralized. In each case, however, neutralization of Group B resins must be carried out to an extent sufficient to render the polymer substantially water soluble.

With mer units having the structural formula (IVb), a similar neutralization technique may be used using a carboxylic acid (i.e., to increase the water solubility of the polymer), a dicarboxylic acid (for the same reason, as well as to provide cross-linking) such as adipic or succinic acids, or a polyacid. Examples of suitable acids include oxalic acid, fumaric acid, malonic acid, maleic acid, dihydroxyfumaric acid, succinic acid, glutamic acid, adipic acid, phthalic acid, isophthalic acid, terephthalic acid, 1,2-, 1,3- and 1,4-cyclohexane dicarboxylic acid, 1,2- and 1,3-cyclopentane dicarboxylic acid, citric acid, tartaric acid, 1,2,3-, 1,2,4- and 1,3,5-benzene tricarboxylic acid, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, α-amino acids such as aspartic acid, glutamic acid, and the like. Any one of these acids may also be substituted, e.g., with one or more alkyl, typically lower alkyl, groups, or they may be converted to anhydride form.

As with Group A resins, polymers of Group B may contain two or more different structural units of the first type and two or more different structural units of the second type.

In the mer units of formula (IVa) and (IVb), $R^3$, as noted above, is either hydrogen or lower alkyl, while $R^{4a}$ and $R^{4b}$ preferably being lower alkyl. In the commercially available material sold under the trademark Carboset®, for example, $R^3$ and $R^4$ are both methyl.

In the mer units of formula (V), $R^5$ is carboxylate, phosphate or sulfonate, although carboxylate is preferred. $R^6$ is a cationic counterion associated with $R^5$, and is preferably a quaternary ammonium moiety, e.g., imidazolyl, pyrrolidinyl, $NR^7_4{}^+$, wherein $R^7$ is hydrogen or lower alkyl, or $R^6$ may represent a nitrogen atom in a polymer such as polyethyleneimine, or a nitrogen atom in a diamine cross-linking group, such that $R^6$ provides for linkage to another segment of the resin in an intramolecularly crosslinked network.

Still other polymers useful for formulating the present ink compositions are those of Groups C and D. Group C polymers comprise first mer units having the structure (VI) —$CH_2$—$CH_2$—NH— and second mer units having the structure (VII) —$CH_2$—$CH_2$—$NR^8$— or (VIII) —$CH_2$—CH(COOH)—, wherein, in structure (VII), $R^8$ represents hydrogen, alkyl of 3 to 16 carbon atoms, or lower acyl —(CO)—$R^9$ where $R^9$ is lower alkyl. Examples of such polymers are thus the following:

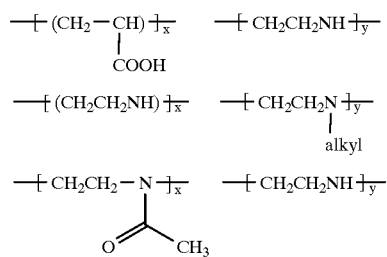

Group D polymers have backbones containing a polyethylene glycol moiety and mer units having the structures (IX), (X), (XI) or combinations thereof.

(IX)

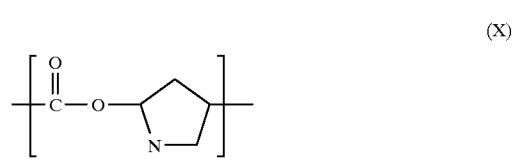

(X)

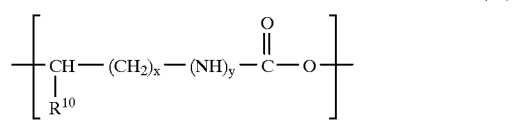

(XI)

In these structures, $R^{10}$ is —COOH or —$NH_2$, x is 0 to 4, and y is 0 or 1. Particularly preferred polymers within this group are those derived from polyethylene glycols and an amino acid such as aspartic acid, glutamic acid, lysine or 4-hydroxyproline. Examples of such polymers are as follows:

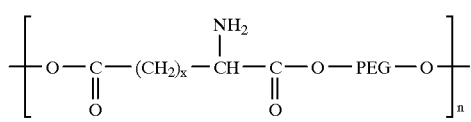

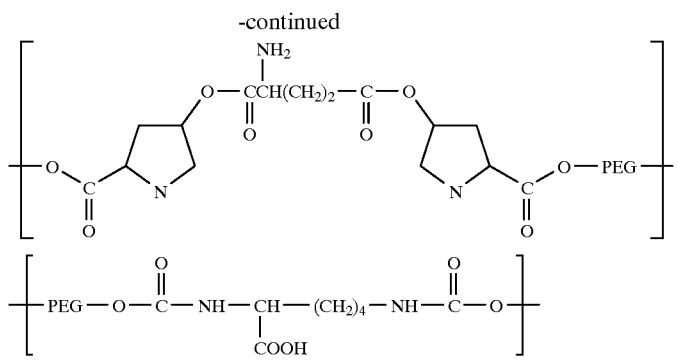

The polymers of Groups C and D, when containing acidic groups, are preferably neutralized as described previously, e.g., initially using a volatile neutralizing agent such as ammonia and subsequently with a nonvolatile organic base such as imidazole or the like. As above, a particularly preferred embodiment involves partial neutralization of the selected polymer's pendant acidic groups, followed by further neutralization with a heterocyclic amine such as imidazole, with the relative amounts of polymer, ammonia and heterocyclic amine selected to provide the desired water solubility of the polymer.

For the present purpose, it should be emphasized that these novel polymers are particularly useful in conjunction with the inventive ink formulations. However, it will be appreciated that some or all of these polymers may have other utility as well, e.g., in biomaterials or the like.

The novel polymers may be synthesized from monomeric starting materials or they may be prepared by chemically modifying commercially available products, using techniques well known or readily available to those skilled in the art of polymer chemistry. Typically, to prepare Group A and Group B polymers, modification of standard, commercially available polymers will take the form of treating the polymer so that it then contains both hydrophobic and ionic portions. For example, commercially available resins which contain pendant carboxyl groups may be modified so that a fraction of those groups are ionic and associated with hydrophobic counterions, e.g., imidazolium ions or quaternary ammonium salts. Examples of commercially available resins which may be modified in this way include the following acrylate-based polymers: Aqua-hyde® (Lawter Chemicals, Inc.); Surcol® (Allied Colloids Group Limited); Zinpol® (Zinchem, Inc.); Neocryl® (Beatrice Foods Co.); Carbosets® 514H (B.F. Goodrich); and Joncryl® (S.C. Johnson & Son, Inc.). As noted above, generally between about 0.01% and 100% and preferably between about 10% to 100% of the pendant carboxyl groups in such polymers may be rendered ionic in this manner.

Group C polymers containing mer units (VI) and (VII) can generally be prepared by treating polyethyleneimine with any one of a variety of alkyl and/or aryl halides, typically $C_2$–$C_{16}$ alkyl and/or aryl halides, in a solvent such as methanol, dimethyl formamide, tetrahydrofuran, or the like. Polymers containing mer units (VI) and (VIII) can be prepared by copolymerization of aziridine and methyl acrylate under acidic conditions, followed by alkaline hydrolysis of the acrylate group.

Group D polymers are generally prepared by first activating an a-amino-protected diacid with N-hydroxysuccinimide to provide an activated ester, e.g., of aspartic acid, glutamic acid, or the like, and then reacting the activated ester with polyethylene glycol, and hydrolyzing the resulting product.

Methods of Manufacture and Use

The aforementioned ink compositions may be prepared in any number of ways, as will be appreciated by those working in the field of printing ink chemistry and ink manufacturing technology. A preferred method for formulating the ink compositions, however, involves first dispersing the selected colorant in deionized water (or obtaining a predispersed colorant/water admixture), followed by admixture with a solution of the selected binder material(s) in water, in turn followed by incorporation of additives such as humectant, anti-foaming agent, and the like, and any species necessary for purposes of neutralization, e.g., an amine such as ammonia and/or imidazole when an acidic resin is used. This admixture is then stirred and mixed in either a fine ball mill or an emulsifier mixer, and filtered to achieve a particle size of less than about 5 $\mu$m, preferably less than about 1 $\mu$m, in diameter.

The ink compositions of the invention may be used as jet printing inks, flexographic inks, lithographic inks, screen printing inks, or the like. Depending on the desired utility, the viscosity of the ink composition will need to be adjusted. For example, the preferred viscosity for a jet printing ink is in the range of approximately 1.5 to 15 cP, more preferably in the range of approximately 1.5 to 10 cP, and most preferably in the range of approximately 3 to 5 cP, while the preferred viscosity for a screen printing ink is in the range of approximately 100 to 400 cP, more preferably in the range of about 200 to 300 cP.

When tailored for use with pc printers, the present ink composition need not be limited with respect to sonic velocity or resistivity. However, viscosity considerations are somewhat different than for other end uses, insofar as lower viscosities are generally preferred for pc printing, typically less than about 2.5 cP, preferably less than about 2.0 cP, and most preferably in the range of about 1.5 to 2.0 cP. It is generally desirable that when formulating the compositions for pc printers, the binder material should comprise a mixture of two monomeric materials, preferably a di- or polyacid in combination with a di- or polyamine, as discussed hereinabove. Also, any components selected for use in pc printing ink compositions should be thermally stable, as they are subjected to higher temperatures, in general, than other types of inks. Finally, pc printing inks may involve a different pH range than other types of ink compositions, and should be chloride-free to avoid corrosion.

As explained in U.S. Pat. No. 5,106,417 to Hauser et al., viscosity may be adjusted using any known substances so long as those materials do not adversely affect the ink composition and the substrate on which the composition is ultimately applied. Suitable viscosity control agents include, for example, polyvinyl alcohol, hydroxylpropyl cellulose, methyl cellulose, water soluble acrylic resins and polyvinylpyrrolidone.

The ink compositions of the invention are not intended to be limited to use on particular substrates. The present compositions are in fact quite versatile insofar as they may be used on paper, plastic, metal, ceramics, and the like. In some cases, for example with a number of plastic materials, it may be necessary to pretreat the surface on which the ink is to be applied so that it is rendered hydrophilic, i.e., such that carboxyl or other ionized groups are provided thereon.
Experimental The practice of the present invention will employ, unless otherwise indicated, conventional techniques of synthetic organic chemistry, polymerization, ink manufacture, and the like, which are within the skill of the art. Such techniques are explained fully in the literature. See, e.g.: Kirk-Othmer, *Encyclopedia of Chemical Technology* (New York: John-Wiley & Sons, latest edition); House, Modern Synthetic Reactions (Menlo Park, Calif.: The Benjamin/Cummings Publishing Company, 1972); and Odian, *Principles of Polymerization*, Second Edition (New York: John Wiley & Sons, 1981). All patents and publications mentioned herein are incorporated by reference.

It is to be understood that while the invention has been described in conjunction with the preferred specific embodiments thereof, that the description above as well as the examples which follow are intended to illustrate and not limit the scope of the invention. Other aspects, advantages and modifications within the scope of the invention will be apparent to those skilled in the art to which the invention pertains.

In the following examples, efforts have been made to insure accuracy with respect to numbers used (e.g., amounts, temperature, etc.) but some experimental error and deviation should be allowed for. Unless indicated otherwise, temperature is in degrees Centigrade and pressure is at or near atmospheric.

Starting materials were obtained as follows: maleic anhydride, from the Sigma Chemical Company (St. Louis, Mo.); acetonitrile, acrylamide, 2-acrylamido-2-methyl-1-propane sulfonic acid, acrylic acid, acrylonitrile, acryloyl chloride, 1-dodecyl alcohol, imidazole, octadecylamine, polyethyleneimine, triacetin, vinylimidazole, N-vinylpyrrolidone and vinyltrimethylsilane, from the Aldrich Chemical Company (Milwaukee, Wis.); azobisisobutyronitrile, from Alfa (Ward Hill, Mass.); N-methyl-2-pyrrolidone, from GAF Corporation (New York, N.Y.); Dispersol Black CR-N, Dispersol Black XF, from Zeneca, Inc. (Wilmington, Del.); Acid Black 41, from Crompton & Knowles (New York, N.Y.); Hostafine Black TS, from Hoechst Aktiengesellschaft (Frankfurt, Germany); and poly ammonium (acrylate co-acrylic acid) (Carboset® 514H), from B.F. Goodrich (Akron, Ohio).

EXAMPLE 1

Polymerization of N-VinylPyrrolidone, Vinylimidazole, and Maleic Anhydride (1:0.5:1)

Maleic anhydride (3.2 g, 30 mmol) was dissolved in warm water (2.79 g). Then N-vinylpyrrolidone (3.33 g, 30 mmol) and vinylimidazole (1.54 g, 15 mmol) were added, followed by azobisisobutyronitrile (167 mg) under an argon atmosphere. This mixture was heated to 65° C. and kept at that temperature for 48 h. The mixture was then cooled and water (6.61 g) was added to bring the solution to 50 wt. % terpolymer. As confirmed using infrared (IR) and nuclear magnetic resonance (NMR) spectroscopy, the resin so provided had the structure

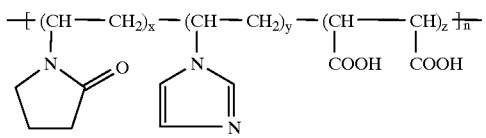

EXAMPLE 2

Polymerization of N-Vinylpyrrolidone, Acrylonitrile, and Maleic Anhydride (1:0.5:1)

The procedure of Example 1 was repeated under identical conditions but with acrylonitrile (0.88 g, 15 mmol) instead of vinylimidazole. As before, a 50 wt. % terpolymer solution was prepared. As confirmed using IR and NMR spectroscopy, the structure of the resin so provided was as follows:

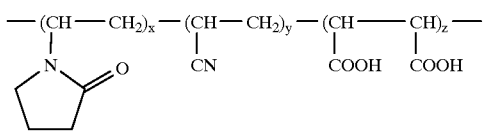

EXAMPLE 3

Polymerization of N-Vinylpyrrolidone, Vinylimidazole, and Acrylonitrile (1:1:1)

N-vinylpyrrolidone (3.33 g, 30 mmol), vinylimidazole (2.82 g, 30 mmol), and acrylonitrile (1.59 g, 30 mmol) were mixed together in acetonitrile (18.06 g). Azobisisobutyronitrile (158 mg) was added and the mixture was flushed with argon, then heated at 60° C. for 2 h. The temperature was raised to 80° C. and the mixture heated for 16 h. The terpolymer formed a precipitate during the reaction. Acetonitrile was evaporated and the product was dissolved in acidified water to obtain an 18 wt. % polymer solution. As confirmed using IR and NMR spectroscopy, the structure of the resin so obtained was as follows:

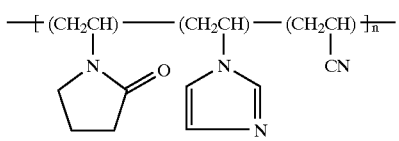

EXAMPLE 4

Polymerization of N-Vinylpyrrolidone, Vinylimidazole, and Acrylamidomethylpropane Sulfonic Acid (1:1:0.4)

N-vinylpyrrolidone (3.33 g, 30 mmol), vinylimidazole (2.82 g, 30 mmol), and 2-acrylamido-2-methyl-1-propane sulfonic acid (2.48 g, 12 mmol) were dissolved in water (2.88 g) under argon atmosphere. Then azobisisobutyronitrile (167 mg, 2 wt. % with respect to the monomers) was added. This reaction mixture was heated to 60° C. for 2 h with constant stirring, then cooled. Water was then added to dilute the solution to 40 wt. % terpolymer. A homogeneous solution was obtained. As confirmed using IR and NMR spectroscopy, the structure of the resin so obtained was as follows:

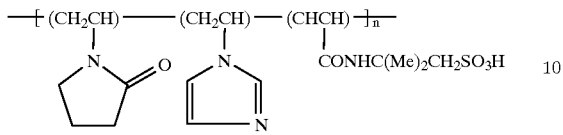

EXAMPLE 5

Polymerization of N-Vinylpyrrolidone, Acrylonitrile and 2-Acrylamido-2-methyl-1-propane Sulfonic Acid (1:1:0.5)

N-vinylpyrrolidone (3.33 g, 30 mmol), acrylonitrile (2.82 g, 30 mmol), and 2-acrylamido-2-methyl-1-propane sulfonic acid (3.1 g, 15 mmol) were dissolved in water under argon atmosphere. Azobisisobutyronitrile (185 mg) was added and the reaction mixture heated to 75° C. for 18 h, after which it was cooled and more water was added to bring the solution to 30 wt. % terpolymer. As confirmed using IR and NMR spectroscopy, the structure of the resin so obtained was identical to that determined for the resin prepared in Example 4.

EXAMPLE 6

Polymerization of N-Vinylpyrrolidone, Vinylimidazole, and Acrylamide (1:1:0.1)

N-vinylpyrrolidone (3.33 g, 30 mmol), vinylimidazole (2.82 g, 30 mmol), and acrylamide (0.214 g, 1 mmol) were dissolved in water (12.72 g) under argon atmosphere. Azobisisobutyronitrile (127 mg) was added and the reaction mixture heated to 80° C. for 15 h. The reaction mixture was allowed to cool, and then water was added to bring the solution to 14.5 wt. % polymer. As confirmed using IR and NMR spectroscopy, the structure of the resin so obtained was as follows:

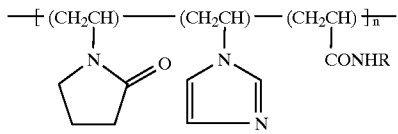

EXAMPLE 7

Polymerization of N-Vinylpyrrolidone, Vinylimidazole, and Vinyltrimethylsilane (1:1:0.7)

N-vinylpyrrolidone (3.33 g, 30 mmol), vinylimidazole (2.82 g, 30 mmol), and vinyltrimethyl silane (2.22 g, 21.9 mmol) were dissolved in acetonitrile (2.79 g) under argon atmosphere. Then azobisisobutyro nitrile (167 mg) was added and the mixture heated to 75° C. for 18 h. Acetonitrile was evaporated to yield the terpolymer, and this polymer wad dissolved in absolute ethanol to obtain a 50 wt. % polymer solution. As confirmed using IR and NMR spectroscopy, the structure of the resin so obtained was as follows:

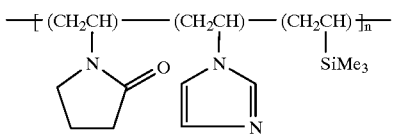

EXAMPLE 8

Polymerization of N-Vinylpyrrolidone, Acrylonitrile, and Vinyltrimethylsilane (1:1:1)

N-vinylpyrrolidone (6.66 g, 60 mmol), acrylonitrile (3.18 g, 60 mmol), and vinyltrimethylsilane (8.9 g, 60 mmol) were dissolved in acetonitrile (6.25 g) under an inert atmosphere. Azobisisobutyro-nitrile (374 mg) was added and the mixture heated to 70° C. for 2 h. The terpolymer precipitated in acetonitrile. The precipitated polymer was dissolved in a mixture containing equal amounts of DMF and acetonitrile to obtain a 33 wt. % polymer solution. As confirmed using IR and NMR spectroscopy, the structure of the resin so obtained was as follows:

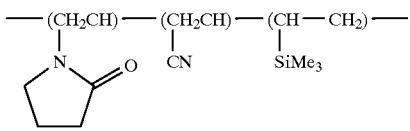

EXAMPLE 9

Polymerization of N-Vinylpyrrolidone, Vinylimidazole, and Vinyltrimethylsilane (1:1:1)

N-vinylpyrrolidone (6.66 g, 60 mmol), vinylimidazole, (5.64 g, 60 mmol), and vinyltrimethylsilane (8.9 g, 60 mmol) were dissolved in acetonitrile (7.06 g) under argon atmosphere. Azobisisobutyronitrile (424 mg) was added and the mixture was heated to 70° C. for 18 h. This mixture was cooled and then acetonitrile (15.1 g) was added to bring the solution to 50 wt. %. As confirmed using IR and NMR spectroscopy, the structure of the resin so obtained was as follows:

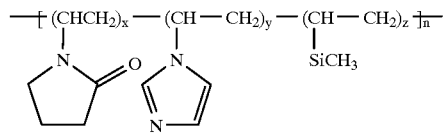

EXAMPLE 10

Polymerization of N-Vinylpyrrolidone, Vinylimidazole, and Acrylic Acid (3:0.5:1)

N-vinylpyrrolidone (4.168 g, 37.5 mmol), vinylimidazole, (0.588 g, 6.25 mmol), and acrylic acid (0.9 g, 12.5 mmol) were dissolved in water (8.48 g) under an argon atmosphere. Azobisisobutyronitrile (113 mg) was added to the above reaction mixture and the mixture heated to 75° C. for 1.5 h. The polymer gelled. Enough water was added to the gelled polymer to bring the solution to 14 wt. %, and the preparation was stirred at room temperature overnight to get a homogeneous solution. As confirmed by IR and NMR spectroscopy, the structure of the resin so obtained was as follows:

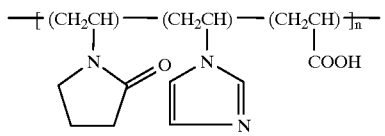

EXAMPLE 11

Polymerization of N-Vinylpyrrolidone, Vinylimidazole, and Methyl Methacrylate (1:1:0.75)

N-vinylpyrrolidone (6.66 g, 60 mmol), vinylimidazole, (5.64 g, 60 mmol), methyl methacrylate (3.88 g, 4.5 mmol) and azobisisobutyronitrile (0.32 mg) were dissolved in water (10.78 g) under an argon atmosphere. This mixture was heated to 55° C. and kept at this temperature for 3 min. The solution became highly viscous. Immediate cooling of the mixture resulted in a soft solid. Water was added to this solid to bring the solution to 15 wt. % polymer. The polymer did not dissolve completely on standing at room temperature overnight, therefore, the solution was treated with 8 N HCl (bringing it to a 14.1 wt. % solution) and heated at 80° C. for 8 h; a homogeneous solution resulted. As confirmed using IR and NMR spectroscopy, the structure of the resin so obtained was as follows:

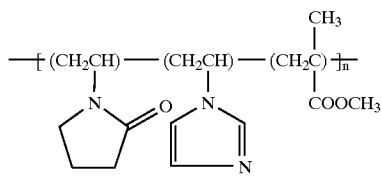

EXAMPLE 12

Polymerization of N-Vinylpyrrolidone. Vinylimidazole, and $CH_3(CH_2)_{17}NHCOCH=CH_2$ (1:1:0.05)

(a.) Preparation of $CH_3 (CH_2)_{17}NHCOCH=CH_2$:

Octadecylamine ($CH_3(CH_2)_{17}NH$, 14.5 g) (90% technical grade) was dissolved in chloroform (200 mL), and freshly distilled triethylamine (15 mL) was added. A clear solution formed. This solution was cooled with ice, acryloyl chloride (8 mL) was added, and the solution was stirred at room temperature for 18 h. Water (200 mL) was added, followed by just enough dilute HCl to neutralize excess triethylamine. Then the chloroform layer was washed with water and dried over anhydrous $MgSO_4$. Chloroform was evaporated to obtain the corresponding amide, $CH_3(CH_2)_{17}NHCOCH=CH_2$, in 75% yield.

(b.) N-vinylpyrrolidone (3.33 g, 30 mmol), vinylimidazole (2.82 g, 30 mmol), the acrylamido derivative obtained in part (a.) (0.48 g, 1.5 mmol), and azobisisobutyronitrile (132 mg) were mixed in acetonitrile (13.26 g). This mixture was heated to 85° C. for 2.3 h. A homogenous viscous solution was obtained. Acetonitrile was evaporated to get a solid polymer. This polymer was dissolved in acidified water to bring the polymer solution to 12 wt. %. As confirmed using IR and NMR spectroscopy, the structure of the polymer was as follows:

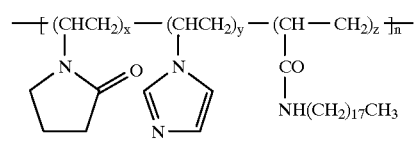

EXAMPLE 13

Treatment of N-Vinylpyrrolidone/Acrylic Acid Copolymer with Imidazole

The copolymer N-vinylpyrrolidone/acrylic acid (molar ratio of those repeat units=3:1, mol. wt=80,000) (5 g) was mixed with imidazole (0.21 g) in water (20.84 g) solution. This mixture was stirred very well to obtain a homogenous solution. In this experiment, 25% acrylic acid was neutralized. The structure of the product was confirmed using IR and NMR spectroscopy to be the following:

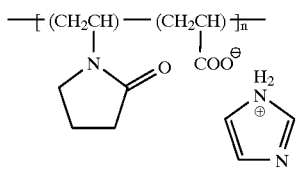

EXAMPLE 14

A black jet printing ink was prepared as follows. Dispersol Black CR-N (4.9 g) and Dispersol Black XF (3.0 g), were dispersed in deionized water. A 10–20 wt. % solution of poly ammonium (acrylate-co-acrylic acid) (Carboset® 514H) was then prepared in deionized water as well (a total of 100 g water was used), and mixed at room temperature using a conventional mixer. The pigment dispersion was then admixed with the resin solution, and the following additional components were incorporated into the admixture: 12.5 g 1-dodecyl alcohol, as a de-foaming agent; 0.1 g imidazole (Aldrich), to functionalize the resin, i.e., to convert it to polyimidazolium (acrylate-co-acrylic acid); and 0.2 g N-methyl-2-pyrrolidone and 0.2 g triacetin, as humectants. The admixture was then mixed in a fine ball mill and filtered through a 22 μm filter, a 5 μm filter and a 1.2 μm filter in succession. The ink was then used to write on white paper, allowed to dry for five minutes, and tested for fastness by dipping the paper for several hours in different liquids. The dried ink was found to be insoluble in all of the liquids tested, including water, toluene and isopropyl alcohol.

EXAMPLE 15

A black jet printing ink was prepared as follows. Dispersol Black CR-N (49 g) and Dispersol Black XF (30 g) were dispersed in deionized water. A 40% wt. % solution of poly ammonium (acrylate-co-acrylic acid) (Carboset® 514H) was prepared in deionized water as well (a total of 100 g water was used), and mixed at room temperature using a conventional mixer. The pigment dispersion was then admixed with the resin solution, and the following additional components were incorporated into the admixture: 12.5 g 1-dodecyl alcohol, as a de-foaming agent; 1.0 g imidazole, to functionalize the resin; and 2.0 g N-methyl-2-pyrrolidone and 2.0 g triacetin, as humectants. The admixture was then mixed in a fine ball mill and filtered through a 22 μm filter, a 5 μm filter and a 1.2 μm filter in succession.

The ink was then used to write on white paper, allowed to dry for five minutes, and tested for fastness as in the preceding example. The dried ink was found to be insoluble in all of the liquids tested, including water, toluene and isopropyl alcohol.

EXAMPLE 16

An ink composition according to the invention was prepared by admixing 2.5 g poly ammonium (acrylate-co-acrylic acid) (Carboset® 514H) with 7.5 g deionized water, and adjusting the pH of the admixture to 8.5 using ammonium hydroxide. 1.6 g of 50% polyethyleneimine predissolved in 8.4 g deionized water, adjusted to pH 10 with ammonium hydroxide, was added to the resin/water solution. Five drops of Hostafine Black TS (Hoechst Celanese) dye was then added and the mixture stirred. The ink was then used to write on white paper, allowed to dry for five minutes, and tested for fastness as in the preceding examples. The dried ink was found to be insoluble in all of the liquids tested, including water, toluene, acetone, isopropyl alcohol, and detergent solution (pH 8).

EXAMPLE 17

An ink composition according to the invention was prepared by admixing 2.5 g poly ammonium (acrylate-co-acrylic acid) (Carboset® 514H) with 7.5 g deionized water, and adjusting the pH of the admixture to 8.5 using ammonium hydroxide. 1.6 g of 50% polyethyleneimine predissolved in 8.4 g deionized water, adjusted to pH 10 with ammonium hydroxide, was added to the resin/water solution. 0.6 g Acid Black 41 dye was then added and the mixture stirred. The ink was then used to write on white paper, allowed to dry for five minutes, and tested for fastness as in the preceding examples. The dried ink was found to be insoluble in all of the liquids tested, including water, toluene, acetone, isopropyl alcohol, and detergent solution (pH 8).

EXAMPLE 18

An ink composition according to the invention was prepared by admixing 1.25 g polyacrylic acid with 8.75 g deionized water, and adjusting the pH of the admixture to 10 using ammonium hydroxide. 0.32 g of polyethyleneimine predissolved in 12 g deionized water was added to the resin/water solution. Seven drops Hostafine Black TS dye was then added and the mixture stirred. The ink was then used to write on white paper, allowed to dry for five minutes, and tested for fastness as in the preceding examples. The dried ink was found to be insoluble in all of the liquids tested, including water, toluene, acetone, isopropyl alcohol, and detergent solution (pH 8).

EXAMPLE 19

An ink composition according to the invention was prepared by dispersing pigment (Hostafine Black TS) in deionized water to give a 5.6 wt. % solution. A 31.9 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.08 wt. % imidazole; 0.31 wt. % N-methyl-2-pyrrolidone; and 0.19 wt. % triacetin. The ink was then used to write on white paper, allowed to dry for five minutes, and tested for fastness as in the preceding examples. The dried ink was found to be insoluble in all of the liquids tested, including water, toluene, acetone, isopropyl alcohol, and detergent solution (pH 8).

EXAMPLE 20

An ink composition according to the invention was prepared by dispersing pigment (Hostafine Black TS) in deionized water to give a 4.8 wt. % solution. A 52.5 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.07 wt. % imidazole; 0.16 wt. % N-methyl-2-pyrrolidone; and 0.15 wt. % triacetin. The ink was then used to write on white paper, allowed to dry for five minutes, and tested for fastness as in the preceding examples. The dried ink was found to be insoluble in all of the liquids tested, including water, toluene, acetone, isopropyl alcohol, and detergent solution (pH 8).

EXAMPLE 21

An ink composition according to the invention was prepared by dispersing pigment (Hoechst Hostafine Black TS) in deionized water to give a 4.1 wt. % solution. A 49.9 wt. % solution of poly ammonium (acrylate-co-acrylic acid) (Carboset® 514H, obtained from B.F. Goodrich) was prepared in deionized water, and mixed at room temperature using a conventional mixer. The pigment dispersion was then admixed with the resin solution, and 0.06 wt. % imidazole was then incorporated into the admixture. The ink was then used to write on white paper, allowed to dry for five minutes, and tested for fastness as in the preceding examples. The dried ink was found to be insoluble in all of the liquids tested, including water, toluene and isopropyl alcohol.

EXAMPLE 22

An ink composition according to the invention was prepared by dispersing pigment (Hostafine Black TS) in deionized water to give a 5.5 wt. % solution. A 50.0 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.07 wt. % imidazole; 0.22 wt. % N-methyl-2-pyrrolidone; and 0.19 wt. % triacetin. The ink was then used to write on white paper, allowed to dry for five minutes, and tested for fastness as in the preceding examples. The dried ink was found to be insoluble in all of the liquids tested, including water, toluene and isopropyl alcohol.

EXAMPLE 23

An ink composition according to the invention was prepared by dispersing pigment (Hostafine Black TS) in deionized water to give a 5.5 wt. % solution. A 49.6 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.07 wt. % imidazole; 0.22 wt. % N-methyl-2-pyrrolidone; and 0.20 wt. % triacetin. The ink was then used to write on white paper, allowed to dry for five minutes, and tested for fastness as in the preceding examples. The dried ink was found to be insoluble in all of the liquids tested, including water, toluene and isopropyl alcohol.

EXAMPLE 24

An ink composition according to the invention was prepared by dispersing pigment (Hostafine Black TS) in deionized water to give a 5.5 wt. % solution. A 31.8 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.07 wt. % imidazole; and 12.8 wt. % ammonium hydroxide. The ink was then used to write on white paper, allowed to dry for five minutes, and tested for fastness as in the preceding examples. The dried ink was found to be insoluble in all of the liquids tested, including water, toluene and isopropyl alcohol.

EXAMPLE 25

An ink composition according to the invention was prepared by dispersing pigment (Hostafine Black TS) in deionized water to give a 5.5 wt. % solution. A 32.6 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.07 wt. % imidazole; and 6.1 wt. % ammonium hydroxide. The ink was then used to write on white paper, allowed to dry for five minutes, and tested for fastness as in the preceding examples. The dried ink was found to be insoluble in all of the liquids tested, including water, toluene and isopropyl alcohol.

EXAMPLE 26

An ink composition according to the invention was prepared by dispersing pigment (Hostafine Black TS) in deionized water to give a 5.5 wt. % solution. A 33.0 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.07 wt. % imidazole; and 4.6 wt. % ammonium hydroxide. The ink was then used to write on white paper, allowed to dry for five minutes, and tested for fastness as in the preceding examples. The dried ink was found to be insoluble in all of the liquids tested, including water, toluene and isopropyl alcohol.

EXAMPLE 27

An ink composition according to the invention was prepared by dispersing pigment (Hostafine Black TS) in deionized water to give a 5.5 wt. % solution. A 45.2 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.07 wt. % imidazole; and 1.0 wt. % antifoaming agent (Wacker S670). The ink was then used to write on white paper, allowed to dry for five minutes, and tested for fastness as in the preceding examples. The dried ink was found to be insoluble in all of the liquids tested, including water, toluene and isopropyl alcohol.

EXAMPLE 28

An ink composition according to the invention was prepared by dispersing pigment (Hostafine Black TS) in deionized water to give a 5.5 wt. % solution. A 32.3 wt. % solution of poly ammonium (acrylate-co-acrylic acid) (Carboset® 514H) was prepared in deionized water, and mixed at room temperature using a conventional mixer. The pigment dispersion was then admixed with the resin solution, and the following additional components were incorporated into the admixture: 0.07 wt. % imidazole; 0.23 wt. % N-methyl-2-pyrrolidone; 0.19 wt. % triacetin; and 1.0 wt. % antifoaming agent (Wacker S670). The ink was then used to write on white paper, allowed to dry for five minutes, and tested for fastness as in the preceding examples. The dried ink was found to be insoluble in all of the liquids tested, including water, toluene and isopropyl alcohol.

EXAMPLE 29

An ink composition according to the invention may be prepared by dispersing a pigment such as Hostafine Black TS in deionized water to give a 0.1 wt. % to 20 wt. % solution, optimally about a 5 wt. % solution. A solution of the polymer synthesized in Example 1 is prepared in deionized water, and mixed at room temperature using a conventional mixer. As in the preceding examples, the pigment dispersion is then admixed with the resin solution, and the following additional components may be incorporated into the admixture: ammonia, imidazole, and/or polyethyleneimine, or the like, to functionalize the polymer; N-methyl-2-pyrrolidone and triacetin, as humectants; antifoaming agents such as Siliconantifoamer S670 (Wacker) or Carboflow 32W (B.F. Goodrich); and preservatives, biocides, and the like. The ink may then used to write on paper, allowed to dry for five minutes, and tested for fastness in various liquids. The dried ink is expected to be insoluble in water as well as in solvents such as toluene and acetone.

EXAMPLE 30

An ink composition according to the invention may be prepared by dispersing a pigment such as Hostafine Black TS in deionized water to give a 0.1 wt. % to 20 wt. % solution, optimally about a 5 wt. % solution. A solution of the polymer synthesized in Example 4 is prepared in deionized water, and mixed at room temperature using a conventional mixer. As in the preceding examples, the pigment dispersion is then admixed with the resin solution, and the following additional components may be incorporated into the admixture: ammonia, imidazole, and/or polyethyleneimine, or the like, to functionalize the polymer; N-methyl-2-pyrrolidone and triacetin, as humectants; antifoaming agents such as Siliconantifoamer S670 (Wacker) or Carboflow 32W (B.F. Goodrich); and preservatives, biocides, and the like. The ink may then used to write on paper, allowed to dry for five minutes, and tested for fastness in various liquids. The dried ink is expected to be insoluble in water as well as in solvents such as toluene and acetone.

EXAMPLE 31

An ink composition according to the invention may be prepared by dispersing a pigment such as Hostafine Black TS in deionized water to give a 0.1 wt. % to 20 wt. % solution, optimally about a 5 wt. % solution. A solution of the polymer synthesized in Example 6 is prepared in deionized water, and mixed at room temperature using a conventional mixer. As in the preceding examples, the pigment dispersion is then admixed with the resin solution, and the following additional components may be incorporated into the admixture: N-methyl-2-pyrrolidone and triacetin, as humectants; anti-foaming agents such as Siliconantifoamer S670 (Wacker) or Carboflow 32W (B.F. Goodrich); and preservatives, biocides, and the like. The ink may then used to write on paper, allowed to dry for five minutes, and tested for fastness in various liquids. The dried ink is expected to be insoluble in water as well as in solvents such as toluene and acetone.

EXAMPLE 32

An ink composition according to the invention may be prepared by dispersing a pigment such as Hostafine Black TS in deionized water to give a 0.1 wt. % to 20 wt. % solution, optimally about a 5 wt. % solution. A solution of the polymer synthesized in Example 10 is prepared in deionized water, and mixed at room temperature using a conventional mixer. As in the preceding examples, the pigment dispersion is then admixed with the resin solution, and the following additional components may be incorporated into the admixture: ammonia, imidazole, and/or polyethyleneimine, or the like, to functionalize the polymer; N-methyl-2-pyrrolidone and triacetin, as humectants; anti-foaming agents such as Siliconantifoamer S670 (Wacker) or Carboflow 32W (B.F. Goodrich); and preservatives, biocides, and the like. The ink may then used to write on paper, allowed to dry for five minutes, and tested for fastness in various liquids. The dried ink is expected to be insoluble in water as well as in solvents such as toluene and acetone.

EXAMPLE 33

An ink composition according to the invention may be prepared by dispersing a pigment such as Hostafine Black TS in deionized water to give a 0.1 wt. % to 20 wt. % solution, optimally about a 5 wt. % solution. A solution of the polymer synthesized in Example 13 is prepared in deionized water, and mixed at room temperature using a conventional mixer. As in the preceding examples, the pigment dispersion is then admixed with the resin solution, and the following additional components may be incorporated into the admixture: N-methyl-2-pyrrolidone and triacetin, as humectants; anti-foaming agents such as Siliconantifoamer S670 (Wacker) or Carboflow 32W (B.F. Goodrich); and preservatives, biocides, and the like. The ink may then used to write on paper, allowed to dry for five minutes, and tested for fastness in various liquids. The dried ink is expected to be insoluble in water as well as in solvents such as toluene and acetone.

EXAMPLE 34

The terpolymer of Example 1, prepared from N-vinyl pyrrolidinone, acrylonitrile and maleic anhydride, was synthesized and used to formulate an ink composition. The polymer was found to be insoluble in water but soluble in ammoniacal water having a pH of approximately 9.0 to 9.5. Accordingly, an ink was prepared in an ammoniacal vehicle, having the following composition:

Terpolymer (50% aqueous suspension), 2.0 g;
Deionized water, 8.0 g;
$NH_4OH$, sufficient to give a pH of 9.0; and
Hostafine Black TS, 0.1 g.

This ink composition was applied to a substrate and allowed to dry. The dried ink was found to be water-fast.

EXAMPLE 35

The terpolymer of Example 3, prepared from N-vinyl pyrrolidinone, vinyl imidazole and acrylonitrile, was synthesized and used to formulate an ink composition. The polymer was found to be water soluble. Accordingly, an ink formulation was prepared in water, having the following composition:

Terpolymer (20% aqueous solution), 5.0 g;
Deionized water, 5.0 g; and
Hostafine Black TS, 0.06 g.

As with the ink formulation of Example 34, this composition was found to be water-fast.

EXAMPLE 36

The polymer of Example 8, prepared from N-vinyl pyrrolidinone, acrylonitrile and vinyl trimethyl silane, was synthesized and used to prepare an ink formulation. The polymer was found to be soluble in a 3:10 mixture of acetonitrile and water. Accordingly, an ink formulation was prepared containing acetonitrile, and, like the previous formulations, found to be water-fast.

Polymer, 1.0 g;
Deionized water, 10.0 g;
Acetonitrile, 3.0 mL; and
Hostafine Black TS, 0.06 g.

EXAMPLE 37

The terpolymer of Example 6, prepared from N-vinyl pyrrolidinone, vinyl imidazole and acrylamide, was synthesized and used to formulate an ink composition. The polymer was found to be water soluble. An ink formulation was prepared in water, having the composition set forth below, and found to be water-fast.

Terpolymer (33% aqueous solution), 3.0 g;
Deionized water, 7.0 g;
Hostafine Black TS, 0.07 g; and
Polyacrylic acid (10% aqueous solution), 1.5 g.

EXAMPLE 38

A dye-based ink composition according to the invention was prepared as follows. Ten grams Carboset® 1594, 4 g of Duasyn Direct black dye (Hoechst Celanese) and 40 mL of deionized water were placed in a beaker and stirred at room temperature for 10 minutes. In a separate beaker, polyethyleneimine, $M_w$ 500,000 (4.5 g) was dissolved in 20 mL of water by stirring for 10 minutes. The polyethyleneimine solution was then added to the Carboset® solution and the stirring continued. Another 20 mL of water was added with washings of the polyethyleneimine-containing beaker. The stirring was continued at room temperature. N-methyl pyrrolidone (5%) and silicon surfactant L-603 (0.5%) were also added to yield the ink formulation.

In other ink formulations prepared with these components, only 75% each of Carboset® and polyethyleneimine, 50% each of Carboset® and polyethyleneimine and 25% each of Carboset® and polyethyleneimine were used. In still other formulations, polyethyleneimines of varying molecular weight—$M_w$, 700, 2,000, 50,000 and 60,000—were used to prepare ink compositions.

These formulations showed very good water fastness and no bleeding after drying on plain paper.

EXAMPLE 39

A dye-based ink composition according to the invention was prepared as follows. Five grams Carboset® 1594, 4 g of Duasyn Direct black dye (Hoechst Celanese) and 40 mL of deionized water were placed in a beaker and stirred. Triethanolamine (5 g) was dissolved separately in 20 mL of water. The two solutions were mixed and another 20 mL of water was added. The mixture was stirred at room temperature. N-methyl pyrrolidone (5%) and silicon surfactant L-603 (0.5%) were also added. The formulation showed very good water fastness after spotting on plain paper.

EXAMPLE 40

A dye-based ink composition according to the invention was prepared as follows. Ten grams Carboset® 1594, 4 g of Duasyn Direct black dye (Hoechst Celanese) and 40 mL of deionized water were placed in a beaker and stirred. Triethylenetetramine (3 g) was dissolved in water (20 mL) separately by stirring and mixed with the Carboset® and dye solution. Another 20 mL of water was added and the contents stirred at room temperature. N-methylpyrrolidone (5%) was also added. This formulation displayed good water fastness by spotting on plain paper.

EXAMPLE 41

A dye-based ink composition according to the invention was prepared as follows. A mixture of polyethyleneimine, $M_w$ 750,000 (2.5g) and 1,2,4-benzenetricarboxylic acid (5 g) were mixed with 40 mL of water and stirred at room temperature. The two did not dissolve in water and formed an opaque dispersion. The dispersion was treated with ammonia and became a clear solution after stirring for 10–15 minutes. Duasyn Direct black dye (Hoechst Celanese, 4 g) and N-methylpyrrolidone (5 mL) were added along with deionized water until the total volume was approximately 80 mL. The contents were then stirred at room temperature. This formulation displayed very good water fastness by spotting on plain paper.

Analogous formulations were prepared using polyethyleneimines of varying molecular weights, i.e., $M_w$ 700, 2,000, 5,000 and 25,000, and by replacing ammonia with methylamine, dimethylamine, ethanolamine, diethanolamine and morpholine. All of these formulations displayed good water fastness after drying on plain paper.

EXAMPLE 42

A dye-based ink composition according to the invention was prepared as follows. A mixture of 1,2,4-benzenetricarboxylic acid (8 g) and 60 mL of 10% solution of triethylenetetramine were stirred together for 2 hours. Duasyn Direct black dye (Hoechst Celanese, 2.8 g) was then added to the solution and stirring was continued until all components dissolved. Triethanolamine (10 mL) and N-methylpyrrolidone (10 mL) were also added. The resultant composition showed very good water fastness and no bleeding by spotting on plain paper.

Analogous formulations were prepared by replacing triethanolamine with ethanolamine, diethanolamine and morpholine. These also were found to have very good water fastness after drying on plalin paper, and did not display any bleeding.

EXAMPLE 43

A dye-based ink composition according to the invention was prepared as follows. Polyethyleneimine, $M_w$ 750,000 (4 g) was dissolved in 40 mL of deionized water and 4 g Duasyn Direct Black dye added after the polyethyleneimine had dissolved. The mixture was stirred at room temperature. 3,3',4,4'-Benzophenone tetracarboxylic dianhydride was mixed with 20 mL of water in a beaker and ammonia was added until the anhydride dissolved completely. The two solutions were mixed and another 20 mL of water was added, followed by further stirring at room temperature. N-methyl pyrrolidone (5–10%) and ethylene glycol (2%) were also added. After spotting on plain paper, the ink formulation displayed very good water fastness.

Analogous formulations were prepared using polyethyleneimines of varying molecular weight, e.g., $M_w$ 700, 2000, 5000 and 25,000, and by replacing ammonia with methylamine, dimethylamine, ethanolamine, diethanolamine, triethanolamine and morpholine. Ink formulations were obtained having equivalent water fastness to that described above.

EXAMPLE 44

A dye-based ink composition according to the invention was prepared as follows. Carboset® 1594 (5 g) was dissolved in 40 mL of water by stirring at room temperature. Duasyn Direct black dye (Hoechst Celanese, 4 g) was added and stirring was continued until the dye dissolved. Poly(vinylpyridine) (1.5 g) was dissolved separately in 20 mL of water and this solution was added to the Carboset® and dye mixture and stirred at room temperature. N-methylpyrrolidone (5%) and glycerol (2%) were also added. After spotting on paper, the composition showed good water fastness and no bleeding.

EXAMPLE 45

A dye-based ink composition according to the invention was prepared as follows. Triethylenetetramine (4 g) was dissolved in 40 mL of water and Duasyn Direct black dye (Hoechst Celanese, 4 g) was added. The contents were stirred until the dye dissolved. Citric acid (4 g) was dissolved separately in 20 mL of water with stirring and added to the triethylene tetramine solution. A solid separated out which dissolved upon stirring. To this solution N-methyl pyrrolidone (5–10%) and triethanolamine (5–10%) were added and the stirring continued. The composition showed very good water fastness after spotting on paper. The ink was filtered through 5.0 and 1.2 μm filters and printed on plain paper using a Hewlett-Packard 550C Desk Jet printer.

Analogous formulations were prepared by replacing triethanolamine with ethanolamine, diethanolamine, (±)-1-amino-2,3-propanediol and morpholine. These ink formulations were also found to have excellent water fastness and did not bleed after spotting on plain paper.

EXAMPLE 46

A dye-based ink composition according to the invention was prepared as follows. Tartaric acid (4 g) was dissolved in 20 mL of deionized water. In a separate beaker, triethylenetetramine (4 g) was dissolved in 40 mL of deionized water with stirring. To this was added 4 g of Duasyn Direct black dye (Hoechst Celanese) and the stirring continued until the dye had dissolved. The tartaric acid solution was then added and stirring was continued. N-methylpyrrolidone (5%) and triethanolamine (5%) were also added. As with the preceding formulation, this ink was tested by spotting on paper and then printing using an Hewlett-Packard 550C Desk Jet printer.

Analogous formulations were prepared by replacing triethanolamine by ethanolamine, diethanolamine, morpholine and (±)-1-amino-2,3-propanediol. Inks so prepared displayed very good water fastness and did not bleed after application to plain paper.

EXAMPLE 47

A dye-based ink composition according to the invention was prepared as follows. Four g of 3,3',4,4'-benzophenone tetracarboxylic dianhydride were placed in 30 mL of water and stirred, followed by dropwise addition of aqueous ammonia until the anhydride dissolved completely. Duasyn Direct black dye (Hoechst Celanese, 5 g) was added, and the solution was stirred. Triethylenetetramine (2 g) was dissolved separately in 10 mL of water. The two solutions were mixed. N-methylpyrrolidinone (8 mL) and triethanolamine (8 mL) were added and the contents stirred at room temperature. The total volume of the solution was made up to 100 mL by further addition of water. This was filtered through 5 and 1.2 μm millipore filters. This composition was tested by spotting on plain paper and printing on plain paper using a Hewlett-Packard 550C Desk Jet printer. The ink displayed excellent water fastness and no bleeding.

This experiment was repeated by replacing ammonia with methylamine, dimethylamine, trimethylamine, ethylamine, ethanolamine, 3-amino-1,2-propanediol, propanolamine and diethanol amine, giving rise to comparable water-fast ink compositions.

EXAMPLE 48

An ink formulation was prepared containing 30 wt. % Joncryl 90 resin (S.C. Johnson & Sons), 45.25 wt. % deionized water, 0.15 wt. % triacetin, 0.15 wt. % pyrrolidinone, 0.10 wt. % imidazole, 3.0 wt. % isopropyl alcohol, 6.0 wt. % polyethylene glycol 2000, 15.0 wt. % Hostafine TS (Hoechst Celanese), 0.15 wt. % Surfynol 104E and 0.30 wt. % Surfynol DF-75 (Air Products & Chemicals). The formulation was found to have excellent water fastness and displayed no bleeding after application to a plain paper substrate.

We claim:

1. A water-based ink composition comprising an aqueous liquid vehicle, an effective amount of a colorant selected from the group consisting of dyes, pigments and stains, and a binder material which ionically or physically entraps the colorant, the binder material comprising an acrylic acid polymer with 10% to 100% of the carboxylic acid groups thereof having been neutralized with a neutralizing composition comprised of (a) a nonvolatile organic base selected from the group consisting of mono-, di- and tri-substituted lower alkyl amines, diamines having the formula $H_2N—R^8—NH_2$ wherein $R^8$ is lower alkylene or phenylene, ethanolamine, diethanolamine, triethanolamine, morpholine, N-methylmorpholine, imidazole, and mixtures thereof, and (b) a volatile neutralizing agent selected from the group consisting of ammonia methylamine, and mixtures thereof, and further wherein the ink composition has a pH in the range of approximately 4 to 9.

2. The ink composition of claim 1, wherein the acrylic acid polymer is a copolymer selected from the group consisting of acrylamide acrylic acid, acrylonitrile acrylic acid and styrene acrylic acid.

3. The ink composition of claim 1, wherein the nonvolatile organic base is imidazole.

4. The ink composition of claim 2, wherein the nonvolatile organic base is imidazole.

5. The ink composition of claim 1, wherein the volatile neutralizing agent is ammonia.

6. The ink composition of claim 2, wherein the volatile neutralizing agent is ammonia.

7. The ink composition of claim 3, wherein the volatile neutralizing agent is ammonia.

8. The ink composition of claim 4, wherein the volatile neutralizing agent is ammonia.

* * * * *

UNITED STATES PATENT AND TRADEMARK OFFICE
CERTIFICATE OF CORRECTION

PATENT NO. : 5,973,025

DATED : October 26, 1999

INVENTOR(S) : Asutosh Nigam, Subhash Narang, Sei-ichi Yokoi

It is certified that error appears in the above-identified patent and that said Letters Patent is hereby corrected as shown below:

On the title page, item [75]:

Please correct the list of inventors from "Asutosh Nigam, Fremont; Subhash Narang; Sei-ichi Yokoi, both of Redwood City; Sivapackia Ganapathiappan, Fremont; Jitender Mohan Khurana, Mountain View, all of Calif." to --Asutosh Nigam, Fremont; Subhash Narang; Sei-ichi Yokoi, both of Redwood City; all of Calif.--.

Signed and Sealed this

Sixteenth Day of May, 2000

*Attest:*

Q. TODD DICKINSON

*Attesting Officer*     *Director of Patents and Trademarks*